July 20, 1948.  C. L. HOLMSTROM  2,445,433
CUTTER RELIEF MECHANISM FOR MILLING MACHINES
Filed Aug. 9, 1944  2 Sheets-Sheet 1
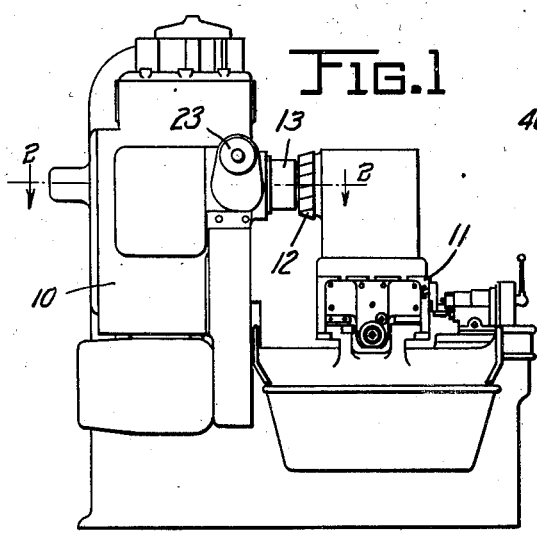
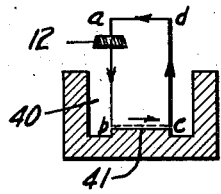
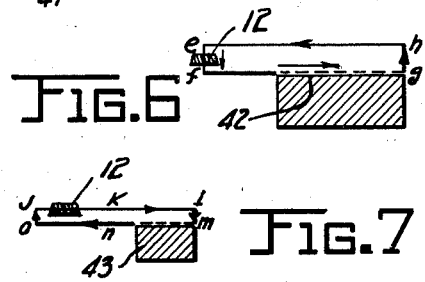
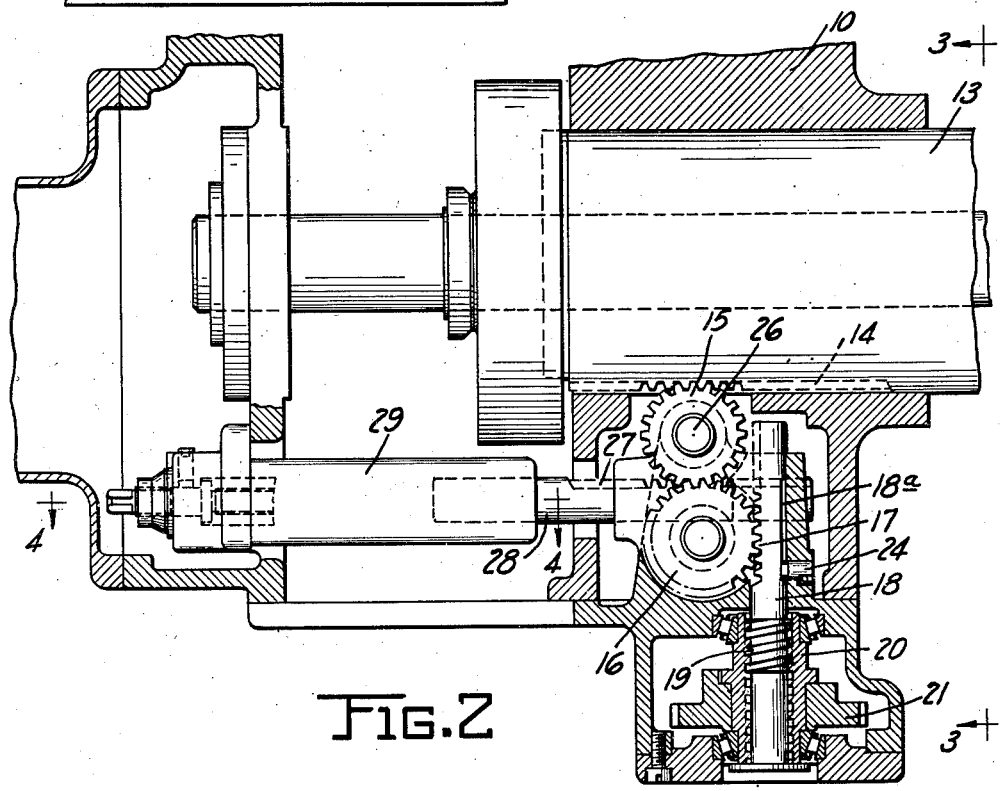
INVENTOR.
CARL L. HOLMSTROM July 20, 1948.   C. L. HOLMSTROM   2,445,433
CUTTER RELIEF MECHANISM FOR MILLING MACHINES
Filed Aug. 9, 1944   2 Sheets-Sheet 2

INVENTOR.
CARL L. HOLMSTROM
BY
his atty

Patented July 20, 1948

2,445,433

UNITED STATES PATENT OFFICE 2,445,433

CUTTER RELIEF MECHANISM FOR MILLING MACHINES

Carl Leland Holmstrom, Rockford, Ill., assignor to Sundstrand Machine Tool Co., Rockford, Ill., a corporation of Illinois Application August 9, 1944, Serial No. 548,686

11 Claims. (Cl. 90—16)

1

This invention relates to milling machines and is concerned particularly with the type of machine in which the cutter spindle is carried in an axially adjustable quill.

One object of the invention is to provide new and improved means for shifting the quill of a milling machine and limiting the axial movement thereof.

Another object of the invention is to provide means for axially shifting the quill of a milling machine and stop means for limiting its movement in either direction, together with a member actuated by the movement of the quill and arranged for engagement with the stop means, the connection between the quill and said member being such that all backlash in the connection is taken up before the member engages a stop.

It is also an object of the invention to provide an adjustable quill for a milling machine, together with stops limiting its movement in either direction, and means for holding the quill forcibly at either limit while the milling tool completes a portion of its cycle to which that position of the quill corresponds.

More specifically, it is an object of the invention to provide a quill mounted for axial adjustment and having a rack with which a driving pinion meshes for effecting such adjustment, together with a second pinion meshing with the rack, a shouldered rod slidable between stops and driven by the second pinion whereby all backlash between the rod and the quill is taken up before a shoulder of the rod engages one of the stops to limit the movement of the quill.

Other objects and advantages of the invention will appear from the following description taken in connection with the drawings in which:

Fig. 1 is a small scale side elevation showing one type of milling machine to which this invention is applicable.

Fig. 2 is a fragmentary plan section taken substantially as indicated at line 2—2 on Fig. 1, and on Fig. 4.

Figs. 5, 6 and 7 are diagrams representing various work cycles in which the shifting of the quill and consequent shifting of the cutter are features of the cycle of operation.

Figure 3:
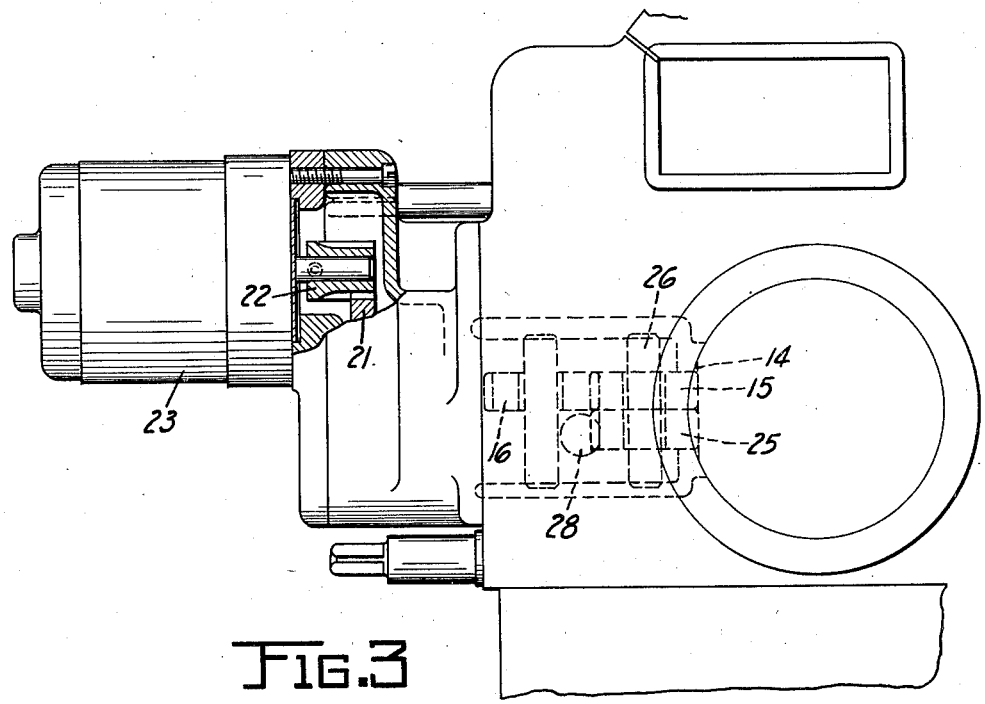
Fig. 3 is a fragmentary front elevation taken substantially as indicated at line 3—3 on Fig. 2.
Figure 4:
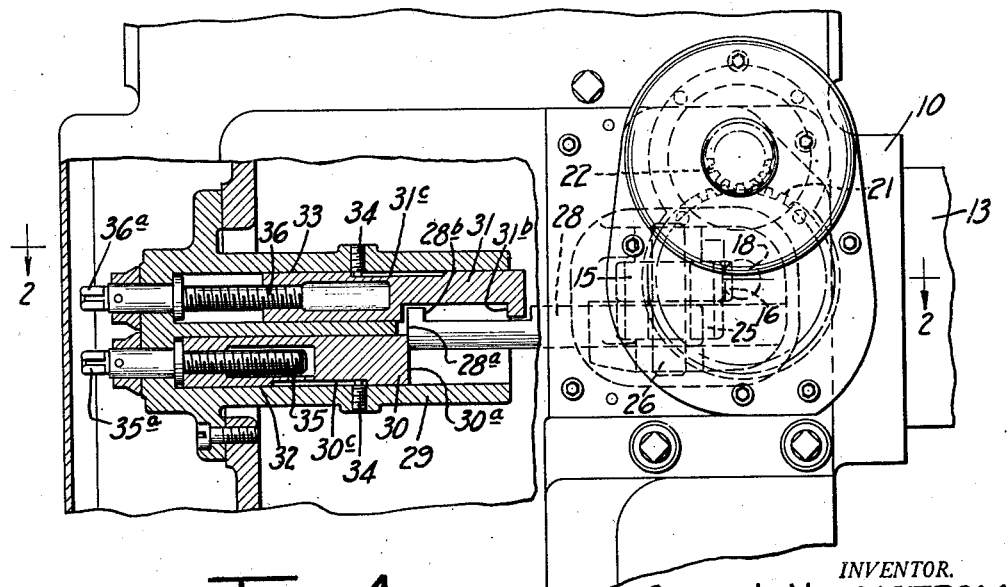
Fig. 4 is a fragmentary side elevation with a portion of the frame or housing broken away and showing the stop members therein in section.

While there is shown in the drawings and described in detail herein certain structure embodying this invention, it is to be understood that the same is not limited to the specific form or application disclosed and that it is the intention to cover all modifications and alternative constructions falling within the scope of the invention as expressed in the claims.

The milling machine illustrated in Fig. 1 is of the type having an upstanding frame 10 with a horizontally movable work table 11 and a cutter 12 which rotates upon a horizontal axis. The cutter shaft or spindle is journaled in a sleeve or quill 13 which is slidably mounted in the frame 10 so that it can be adjusted axially within a limited range for shifting the position of the cutter 12 in carrying it to the work or retracting it therefrom. Since the accuracy of the work performed by the cutter depends upon having the cutter held rigidly in a definite position during its operation, it is important that the adjustment of the quill be accomplished in a manner which insures its definite positioning at its limits of movement, and, particularly, at the working limit. The present invention is concerned with means for moving the cutter between its limits, means for determining the limits of movement accurately, and means for holding the cutter at such limits during operation of the machine.

As shown in Fig. 2, the quill 13 is provided with a rack 14 and is guided for reciprocation in the frame 10 of the machine. A driving pinion 15 meshes with the rack 14 for effecting axial movement of the quill, and this pinion 15 meshes with a gear 16 which in turn meshes with a rack 17 on a rod 18 which is shown mounted for reciprocation in a direction transverse to the axis of the quill 13. A portion of the rod 18 is threaded at 19, and this threaded portion is engaged in a threaded sleeve or nut 20 which carries a gear 21 meshing with the drive pinion 22 of a motor 23. The nut 20 and gear 21 appear in Fig. 2, while the drive pinion 22 and its motor 23 are clearly shown in Fig. 3. It will be evident that upon rotation of the motor 23 the pinion 22 turns the gear 21 and with it the nut 20, and that this rotation of the nut 20 produces longitudinal movement of the rod 18 threaded in the nut 20 and held against rotation by the engagement of a key member 24 with a key way 18a cut in one side of the rod 18. Longitudinal movement of the rod 18 causes its rack teeth 17 to rotate the gear 16 and pinion 15, thus driving the rack 14 and the quill 13 on which it is formed or secured.

Just below the pinion 15 there is a pinion 25 journaled coaxially with the pinion 15 and on the same shaft 26 but rotatable independently of the pinion 15. The pinion 25 also meshes with the rack 14 and is driven thereby in one direction or the other whenever the quill 13 is shifted. The pinion 25 meshes with a rack 27 on a rod 28 shown mounted for reciprocation in a direction parallel to the axis of the quill 13. One end of the rod 28 enters a special housing 29 inside the main frame of the machine, this housing serving to support adjustable stop members 30 and 31. The end surface 30a of the stop member 30 cooperates with the end surface 28a of the rod 28 to limit movement of the rod in one direction. The stop member 31 has a portion cut away at the one side to form a stop shoulder 31b and the rod 28 is similarly cut away at one side to form a cooperating stop face 28b to limit movement of the rod in the other direction.

The stop members 30 and 31 are slidable in guide bores 32 and 33 respectively, which are formed in the housing 29, and the stop members, being cylindrical, are held against rotation by set screws 34 having reduced end portions engaged in longitudinal grooves 30c and 31c in the stop members respectively. The member 30 is internally threaded at one end and is engaged with an adjusting screw 35, while the member 31 is similarly threaded and engaged with an adjusting screw 36. Both screws are provided with squared terminals 35a and 36a respectively, so that a suitable handle or wrench may be applied for operating them. It will be evident that by longitudinal adjustment of the stop members 30 and 31, by means of their adjusting screws 35 and 36, the distance between the stop shoulders or faces 30a and 31b may be varied and the particular positions of these faces may be shifted so as to vary the range of movement of the quill and the position at which that movement shall take place in respect to the work table of the machine.

As the quill travels outwardly under the driving force imparted to it through the gear 16 and pinion 15, the pinion 25 will transmit an equal and opposite movement to the rod 28 which will continue to travel until it strikes the stop shoulder 30a. The driving effort transmitted from the quill through the pinion 25 and rack 27 will have taken up all backlash in this connection so that the quill will be positively arrested the instant the surface 28a of the rod 28 engages the stop surface 30a. Any backlash in the drive connection between the motor 23 and the rack 14 of the quill will have been taken up in the driving effort imparted to the quill; hence, there will be no opportunity for further rotation of the motor after the stop 30a is encountered. However, this motor is preferably of the reversible torque type designed to remain in circuit under this condition and to impart a continuous torque to the driving train for holding the parts rigidly at the limit determined by the position of the stop member 30.

It may be understood that the working cycle of the machine and the operation of the milling tool will usually be controlled automatically by means not shown herein and not constituting a part of the present invention and that upon completion of the portion of the cycle for which the quill is held stationary at the limit defined by the stop 30 the torque motor 23 will be reversed. Thereupon the pinion 22 will drive the gear 21 and the remainder of the connecting train, including the pinion 15 and rack 14, so as to move the quill inwardly with respect to the frame of the machine. Simultaneously, the pinion 25 will transmit movement to the rod 28 for shifting it in the opposite direction and with the backlash taken up between the rack 14, pinion 25 and rack 27, the rod 28 will continue to move until the stop face 28b strikes the stop shoulder 31b of the stop member 31. Thereupon the parts will come to rest instantly with the torque motor remaining in circuit to hold the stop face 28b against the stop shoulder 31b and retain the quill 13 rigidly at this limit of its movement.

Fig. 5 illustrates one class of work which utilizes the axial adjustment of the quill and represents diagrammatically the cycle of movement for operation on the work. In this case, the work is shown as a piece having a deep recess 40. The surface 41 to be faced is located within this recess. Accordingly, while the work is being set up on the work table, the cutter must be retracted to a position such as that indicated at a. Then, as the machine is started, the advance of the quill carries the cutter 12 horizontally along the line ab into position for operation on the surface 41. The feed of the work table then effects relative horizontal movement of the cutter across the surface 41 along the line bc. Upon completion of the facing operation, the quill then retracts the cutter horizontally along the line cd and thereafter a rapid return movement of the work table brings the relative position of the cutter back to a.

Fig. 6 illustrates another typical work cycle in which the movement of the quill plays a part. In this case the work piece has an external surface 42 to be faced. Starting at the point e the diagram indicates that the cutter 12 is shifted by movement of the quill from e to f at which it is in the plane in which it will operate to machine the surface 42. Movement of the work table then effects relative movement of the cutter from f to g for the machining operation. At g the work table is arrested and the quill withdraws the cutter from g to h. Thereafter, the rapid return movement of the work table effects relative movement of the cutter from h to e.

In the cycle illustrated diagrammatically in Fig. 7, it is assumed that the surface 43 of the work piece is to be given a roughing cut and a finish cut. The initial position of the cutter 12 is indicated at j at some distance from the work piece to afford space for setting up the work on the work table of the milling machine. When this has been accomplished and the machine started the table first effects a rapid approach which brings the relative position of the cutter from j to k. Thereafter, the table feed continues at cutting speed, while the cutter accomplishes a roughing cut from k to l. At l the work table is arrested and the quill moves toward the work by a slight distance corresponding to the depth of the finish cut to be made. Then upon reverse travel of the work table the finish cut is accomplished by the cutter in its relative movement from m to n. Thereafter, the work table is speeded up for rapid return and the relative position of the cutter is shifted from n to o. Then, the movement of the quill returns the cutter to its initial position at j.

As already stated the timing of the various table movements and of the shifting of the quill may be accomplished by a suitable program mechanism, and the planned cycle will then be accurately carried out by virtue of the positive control of the quill movement afforded by the mechanism which is the subject of this invention.

It may be understood that the mechanism for controlling the quill in accordance with this invention is applicable to a quill and spindle mounted for vertical adjustment as well as to the horizontally disposed quill illustrated herein and that in a machine of that type the work cycles, above described, may be effected without substantial change. In fact, Figs. 5, 6 and 7 would illustrate such cycles with the understanding that the initial movement of the cutter in each case as it is fed into position for work is in a vertical direction.

I claim as my invention:

1. In a milling machine which includes a frame and a quill slidably mounted therein, means for shifting said quill comprising a rack on the quill, a first pinion meshing with said rack, a motor and drive gearing connecting said motor with the pinion, a second pinion independent of said first pinion and also meshing with the rack on the quill, a slidably mounted rod having a rack in mesh with the second pinion, said rod having a pair of oppositely facing stop shoulders, and a pair of stops engageable by said shoulders respectively for limiting the travel of the quill.

2. In a milling machine which includes a frame and a quill slidably mounted therein, means for shifting said quill comprising a first member drivingly engaging the quill, a motor and drive gearing connecting said motor with said first member, and means for limiting a slidable range of the quill comprising a slidably mounted rod having a pair of oppositely facing stop shoulders, drive gearing independent of said first member and including a second member in engagement with and driven by said quill, said independent drive gearing being arranged to transmit motion from the quill to the rod in either direction, and a pair of stops engageable by said shoulders respectively for limiting the travel of the quill.

3. In a milling machine which includes a frame and a quill slidably mounted therein, means for shifting said quill including a motor and drive gearing connecting said motor to the quill, a slidably mounted rod having a pair of oppositely facing stop shoulders, a rack on the quill, a pinion independent of said drive gearing meshing with said rack and arranged to transmit motion from the quill to the rod together with a pair of stops engageable by said stop shoulders on the rod respectively for limiting the travel of the quill.

4. In a milling machine which includes a frame and a quill slidably mounted therein, means for shifting said quill including a gear, a slidable member having rack teeth meshed with said gear, a portion of said member being threaded, a nut on said threaded portion mounted for rotation and held against axial movement, a motor and gearing connecting said motor to the nut for rotating it, together with means operatively connecting said gear to the quill, a slidably mounted rod having a pair of oppositely facing stop shoulders, drive gearing which is independent of said first mentioned gearing and is arranged to transmit motion from the quill to the rod in either direction and a pair of stops engageable by said shoulders respectively for limiting the travel of the quill.

5. In a milling machine which includes a frame and a quill slidably mounted therein, means for shifting said quill including a gear, a slidable member having rack teeth meshed with said gear, a portion of said member being threaded, a nut on said threaded portion, bearings in which the nut is held against axial movement, a motor and gearing connecting said motor to the nut for rotating it, together with means operatively connecting said gear to the quill, a rack on the quill, a pinion meshing with said rack, a slidably mounted rod having a rack in mesh with said pinion, said rod having a stop shoulder and a fixed stop engageable by said shoulder for limiting the travel of the quill, said motor being a torque motor adapted to remain in circuit for holding the quill at the limit of its travel.

6. In a milling machine which includes a frame and a quill slidably mounted therein, means for shifting said quill comprising a rack on the quill, a pinion meshing with said rack, a motor and drive gearing connecting said motor with the pinion including a slidable member having a rack and having also a threaded portion and a nut on the threaded portion held against endwise movement but rotatable by said motor, a second pinion also meshing with the rack on the quill, a reciprocably mounted rod having a rack in mesh with the second pinion, said rod having a pair of oppositely facing stop shoulders, and a pair of adjustable stops engageable by said shoulders respectively for determining the limits of travel of the quill.

7. In a milling machine which includes a frame and a quill slidably mounted therein, means for shifting said quill comprising a rack on the quill, a pinion meshing with said rack, a gear meshing with the pinion, a slidable member having a rack meshing with said gear and having also a threaded portion, a rotatable nut on the threaded portion held against axial movement, a gear operatively associated with the nut and a motor having a drive pinion meshing with said gear, a second pinion journaled coaxially with the first but unconnected therewith and also meshing with the rack on the quill, a rod mounted for reciprocation parallel to the quill and having a rack in mesh with the second pinion, said rod having a pair of oppositely facing stop shoulders, and a pair of adjustable stops mounted in the frame engageable by said shoulders respectively for determining the limits of travel of the quill, said motor being a reversible torque motor adapted to remain in circuit for holding the quill at either limit of its travel.

8. In a milling machine which includes a frame and a quill slidably mounted therein, means for shifting said quill comprising a rack on the quill, a first pinion meshing with said rack, a motor and drive gearing connecting said motor with the pinion, a second pinion independent of said first pinion and also meshing with the rack on the quill, a slidably mounted rod having a rack in mesh with the second pinion, said rod having a pair of stops supported by the frame laterally adjacent said rod each stop comprising a part rotatably mounted in the frame but fixed against axial movement, and a part slidable in the frame with means preventing its rotation about its axis, said parts being coaxially disposed and being threaded together whereby rotation of one part adjusts the other part longitudinally for varying the position at which it will engage the stop shoulder of the rod.

9. In a machine tool which includes a frame, a work support and a tool support mounted in the frame for sliding movement therein relative to the work support, means for shifting said tool support comprising a driving member engaging said tool support, a motor and drive gearing connecting said motor to said driving member, and means for limiting the sliding movement of the tool support comprising a slidably mounted member having a pair of oppositely facing stop shoulders, drive gearing independent of said first mentioned drive gearing and including a driven member also in engagement with said tool support, said independent drive gearing being arranged to transmit motion from the tool support to said slidably mounted member in either direction, and a pair of stops engageable by said shoulders respectively for limiting the travel of the tool support, said motor being a reversible torque motor adapted to remain in circuit for holding the tool support at either limit of its travel.

10. In a milling machine which includes a frame and a quill slidably mounted therein, means for shifting said quill comprising a first member drivingly engaging said quill, a motor and drive gearing connecting said motor with said member, and means for limiting the slidable range of the quill comprising a slidably mounted member having a stop shoulder, drive gearing independent of said first mentioned drive gearing and including a second member also in engagement with said quill, said independent drive gearing being arranged to transmit motion from the quill to said slidably mounted member, and positive stop means engageable by said stop shoulder for accurately arresting the quill at one limit of its travel.

11. In a milling machine which includes a frame and a quill slidably mounted therein, means for shifting said quill comprising a first member engaging the quill, a torque motor and drive gearing connecting said motor with said member, movable abutment means which derives its movement from the quill independently of said drive gearing, drive means for said movable abutment means, such drive means including a second member also in engagement with the quill, and fixed stop means positively engaging said movable abutment means and arresting the quill accurately at one limit of its travel.

CARL LELAND HOLMSTROM.

REFERENCES CITED

The following references are of record in the file of this patent:

UNITED STATES PATENTS

| Number | Name | Date |
|---|---|---|
| 1,465,721 | Purves | Aug. 21, 1923 |
| 1,976,108 | Archea | Oct. 9, 1934 |
| 1,978,360 | Archea | Oct. 23, 1934 |
| 2,123,825 | De Vlieg | July 12, 1938 |